3,068,204
FLUOTITANATE CATALYSTS FOR PREPARING LINEAR POLYESTERS
Edmond S. Perry and Carl W. Zuehlke, Rochester, N.Y., assignors to Eastman Kodak Company, Rochester, N.Y., a corporation of New Jersey
No Drawing. Filed Aug. 15, 1958, Ser. No. 755,129
5 Claims. (Cl. 260—75)

This invention relates most particularly to a new combination of catalysts useful in preparing fiber and film-forming linear condensation-type polyesters of bifunctional dicarboxylic acids and bifunctional glycols. The especially advantageous novel catalyst composition is composed essentially of from 1 to 2 parts by weight of a zinc salt of a lower alkanoic acid (2 to 6 carbon atoms) such as zinc acetate and from 1 to 2 parts by weight of a fluotitanate salt of a metal which forms colorless salts, e.g. Li, Na, K, Rb, Cs, Mg, Sr, Ba, Ca, Zn, Cd, etc. Such catalyst combinations are effective during the ester interchange reaction producing essentially monomeric esters of the acid and glycol and also during the subsequent polymerization. For example, dimethyl terephthalate can be condensed with ethylene glycol using 100 p.p.m. of zinc acetate and 100 p.p.m. of zinc fluotitanate in a total time of 80 minutes to give an essentially colorless and clear polyester having an intrinsic viscosity (I.V.) of 0.74. This invention also relates to the sole use of a group II metal fluotitanate salt as such a catalyst.

The prior art to which this invention relates contains a great number of disclosures regarding the various methods of preparing fiber and film-forming linear condensation-type polyesters. A great number of polyesterification catalysts have been disclosed. One of the most basic patents relating to this field is U.S. 2,465,319 where a large number of ester interchange catalysts are listed as useful catalysts for the preparation of linear condensation-type polyesters starting with the bifunctional dicarboxylic acid in the form of a lower dialkyl ester. This patent mentions the use of zinc compounds as catalysts. A number of other patents mention the use of zinc acetate and other zinc salts of lower alkanoic acid as catalysts, e.g. Br. 753 880 wherein the alkanoic acid is preferably one containing from 2 to 6 carbon atoms. This same prior art discloses that combinations of catalysts can be employed to produce improved results in some instances. However, it is apparent from a consideration of the prior art that no predictions are possible as to what improvements can be obtained.

Among numerous useful catalysts for preparing polyesters beginning with a dialkyl ester of a bifunctional dicarboxylic acid and a glycol are borates such as zinc borate; oxides such as antimony trioxide, lead oxides, calcium oxide, etc.; alkoxides such as titanium isopropoxide, lithium ethoxide, etc.; halides such as neodymium bromide, cerium chloride, titanium fluoride, etc.; various metal alkyls such as aluminum triethyl, zinc dibutyl, cadmium dihexyl, lead tetraethyl, etc.; lower alkanoic acid esters such as zinc acetate, cobaltous acetate, zinc propionate, manganese formate, cadmium acetate, etc.; free metals such as magnesium, ruthenium, sodium lithium, calcium, etc.; metal hydrides such as lithium hydride, lithium aluminum hydride, etc. Moreover, combinations of two or more of such catalysts sometimes produce unexpected results including synergistic activity. For example, a ternary mixture of various proportions of zinc acetate, antimony trioxide and lithium ethoxide catalyzes both initial ester interchange and subsequent polymerization at good rates, especially when using the powder build-up technique, to give polyethylene terephthalate or other polyesters having highly desirable properties. As another example, similar results can be achieved with binary mixtures of zinc borate and antimony trioxide. These various mixtures containing antimony trioxide are particularly advantageous during the powder build-up phase since antimony trioxide is especially effective in the temperature range generally used for such a build-up. Further examples of mixed catalytic compositions include the combination of zinc acetate with rare earth metal fluorides and the combination of magnesium metal or iodide with free iodine. Of course, other combinations can be used but it is never possible to predetermine what results will be achieved until after the catalytic composition has been actually used. This lack of predictability is one of the grounds upon which the present invention is founded. Some of the other exemplary catalytic combinations have been or are yet to be covered by applications of coworkers in this field. Of course, the patented art shows that a few combinations of this type have been known heretofore.

One of the most crucial problems in selecting catalysts for use in preparing polyesters is the avoidance of color and cloudiness in the polyester being produced. This is especially crucial in the case of those polyesters to be used to form a support or film base for photographic emulsions (either color or black and white) where the optical requirements are such that a substantially colorless and clear polyester is of great importance. Among the few catalysts which have been used in the preparation of polyesters suitable for use in making photographic film supports are the lower alkanoic acid esters of zinc. However, these catalysts have rather slow effects during the latter phases of the polyesterification reaction.

An unusual effect which can be achieved by suitable selection of the catalyst in preparing polyesters for use as photographic film supports is the purposeful selection of a catalytic composition which will produce a colored polyester which in the form of a film support will shift or broaden the maximum absorption of light. Thus a cine-negative support when appropriately tinted will require no separate antihalation coating. A suitable catalyst to achieve this result is cobaltous acetate (film has light lavender coloration). Other catalytic compounds which are or can form colored products can be similarly employed. Binary or ternary catalytic compositions can be used whereby catalytic compounds which form differently colored products either cancel or enhance the coloration caused by the other binary or ternary components. If desired, nearly neutral coloration can be achieved by this latter technique; for example, using cobaltous acetate and zinc acetate as a binary catalyst produces a neutral color; similar results are achieved using cobaltous acetate and cadmium acetate. However, the use of cobaltous acetate and manganese formate produces a lavender colored polyester. These considerations illustrate the difficulties associated with selecting useful catalysts, especially for use as photographic film base.

It is an object of this invention to provide a new combination of catalysts useful for preparing fiber and film-forming linear condensation-type polyesters which are substantially colorless, clear, and useful as photographic film base for black and white or color-type emulsions.

It is an additional object of this invention to provide such catalysts which are more active than the lower alkanoic acid esters of zinc so that polyesters of the desired intrinsic viscosity can be produced in a substantially shorter period of time.

It is another object of this invention to provide a process for preparing linear condensation-type polyesters using a catalytic composition which is effective at rather low concentrations and yet produces reasonably rapid reactions at all stages of the preparation of polyesters being formed from the condensation of the lower dialkyl ester of a bifunctional dicarboxylic acid with a bifunctional glycol.

Other objects will become apparent elsewhere herein.

According to a preferred embodiment of this invention there is provided a catalytic composition useful in preparing condensation-type linear polyesters from a dialkyl ester of a bifunctional dicarboxylic acid and a bifunctional glycol composed essentially of from 1 to 2 parts by weight of zinc acetate and from 1 to 2 parts by weight of a fluotitanate salt of a metal which forms colorless salts.

The fluotitanate salts encompassed within the scope of this invention include lithium, sodium, potassium, magnesium, calcium, zinc and cadmium fluotitanates. Of course, other fluotitanates can also be employed. It appears that zone fluotitanate is to be preferred.

There is no reason in this specification to indulge in an extensive elaboration of the various processes which can be employed in preparing polyesters. U.S. Patent 2,465,319 and many subsequently issued patents such as U.S. 2,727,881 describe such processes in great detail. A common feature of all of the processes with which this invention is concerned is that they begin with a lower dialkyl ester of a bifunctional dicarboxylic acid which is condensed with a bifunctional glycol, the glycol usually being used as such although it can be used in the form of lower alkanoic acid ester thereof, such esters being equivalents of the glycol. The processes with which this invention is concerned involve the initial preparation in the presence of a catalyst of a substantially monomeric protopolymer under conditions facilitating removal of the lower alkanol formed from said lower dialkyl ester by ester interchange with said glycol. This is sometimes referred to as the first stage of the polyester preparation and can be conducted under a variety of conditions using many different types of apparatus. For example, the lower dialkyl ester and the glycol in a mole ratio beginning at about 1 to 1.5 up to 1 to 2.5 can be placed in a reaction vessel equipped with a packed column with the vessel being heated at a temperature which permits the lower alkanol to pass through the column with the glycol being retained by the column and returned to the reaction vessel whereby substantially all of the lower alkanol which can theoretically be produced is removed during this first stage of the polyester preparation which results in a monomeric protopolymer.

The second stage of the polyester preparation involves taking the monomeric protopolymer produced during the first stage and causing such protopolymer molecules to undergo a further ester interchange reaction whereby the superfluous quantities of glycol are removed and long chain polyester molecules are produced. The polymerization of the protopolymer is accomplished under conditions facilitating removal of superfluous quantities of said glycol so that the ultimate eratio of bifunctional dicarboxylic acid moieties to glycol moieties is essentially one to one in the polymer molecule.

The degree of polymerization is proportionate to the intrinsic viscosity of the polyester. A convenient solvent for measuring the intrinsic viscosity is a mixture of 60% phenol and 40% tetrachloroethane. The same intrinsic viscosity for different polyesters does not necessarily represent the same molecular weight. The highly polymeric polyesters contemplated by this invention correspond to an intrinsic viscosity of at least 0.5 for polyethylene terephthalate. Other polyesters having the same molecular weight (12,000–13,000 or higher) may have higher or lower intrinsic viscosities indicative of said minimum molecular weight. As a broad generalization it is desired that the polyesters especially useful for preparing fibers and film have an intrinsic viscosity of about 0.55 or higher.

The polymerization of the protopolymer is generally accomplished during the earlier phases by heating at a temperature above the boiling point of the glycol at whatever pressure is used so that the glycol which is readily removable can be removed by a suitable condenser or other device attached to the reaction vessel. The pressure during this operation is generally atmospheric pressure since lower pressures may produce excessive frothing or other conditions impeding the operation. As the readily removable amounts of the glycol are removed, the temperature is generally raised and the pressure is generally reduced either in increments or gradually so as to eventually result in temperatures from 10 to 100° C. above the boiling point of the glycol and pressures of no more than about 50 mm. of Hg pressure. Advantageously the pressure is as low as the available apparatus can produce, e.g. pressures on the order of a few microns of Hg pressure. As regards the temperatures or pressures it is well recognized that excessively high temperatures will cause discoloration as a result of degradation of products whereas the use of low temperatures especially in combination with pressures as high as several centimeters of Hg pressure will necessitate longer reaction periods which contribute toward discoloration. It is therefore advantageous that the pressure be less than 1 cm. of Hg pressure and the temperature generally be no greater than about 100° C. (preferably max. of 75° C.) above the boiling point of the glycol and no lower than that necessary to melt the polymer being formed.

One of the processes which can be advantageously employed in the preparation of polyesters is the solid-phase polymerization process also sometimes called the powder buildup process. Such a process involves stopping the last stage of the polymerization at a point where the intrinsic viscosity of the polymer (which can be called a prepolymer) is from about 0.2 to about 0.45 using the methods generally described hereinabove, comminuting the prepolymer to form particles which will preferably pass through a 20 mesh screen, and then heating these particles in a vacuum or under an inert circulating atmosphere at a temperature from about 10° to about 60° C. below the melting point of the polyester. The prepolymer particles are advantageously agitated and not allowed to get sufficiently hot that they fuse together. Such a powder buildup process is advantageous when a high intrinsic viscosity is desired and no appreciable coloration of the polyester can be tolerated.

As already mentioned, the prior art contains a great number of disclosures of processes which can be employed and this invention is concerned primarily with the catalytic composition employed in accomplishing such processes.

A further embodiment of this invention provides a process for preparing a highly polymeric condensation-type linear polyester by condensing a lower dialkyl ester of a bifunctional dicarboxylic acid with a bifunctional glycol by first preparing in the presence of a catalyst a substantially monomeric protopolymer under conditions facilitating removal of the lower alkanol formed from said lower dialkyl ester by ester interchange with said glycol and then polymerizing said protopolymer in the presence of a catalyst under conditions facilitating removal of superfluous quantities of said glycol, the improvement consisting of using said catalyst in a concentration of from 50 to 400 parts per million (p.p.m.) based on the weight of said lower dialkyl ester, said catalyst being essentially composed from 1 to 2 parts by weight of zinc acetate and from 1 to 2 parts by weight of a fluotitanate salt of a metal which forms colorless salts, whereby a colorless, clear, highly polymeric polyester can be prepared in less time than when either of said salts is used by itself in the same total concentration.

Alkali metal fluotitanates such as potassium fluotitanate used alone, have no significant activity during the ester interchange stage. However, the group II metal fluotitanates such as the zinc or cadmium salts can be used alone employing a reasonable reaction period to produce polyesters of desirable I.V. and such catalysts can be used in low enough concentrations to avoid significant coloration of the polyester. Quite surprisingly, this invention demonstrates that zinc acetate or related zinc salts can be used in conjunction with fluotitanate salts in low concentrations (50–400 p.p.m.) to give substantially colorless and clear polyesters within a reaction period considerably less than that necessary to achieve a desirable I.V. using the zinc salt by itself in the same total concentration. The use of more than about 1000 p.p.m. (preferably no more than about 500 p.p.m.) of the combination of a zinc salt with a fluotitanate salt is considered to be outside the scope of this invention even though the time of the reaction is unexpectedly short since a substantially colorless polyester will not ordinarily be produced with certain glycols. The use of a group II metal fluotitanate salt by itself is obviously also within the scope of this invention since for a given time of reaction to achieve a desirable I.V. it has a great advantage over using a zinc salt by itself because a far smaller quantity of catalyst is required; hence, the polyester produced contains less metallic content. However, the most superior advantages of this invention are achieved by using the combination of a zinc salt and fluotitanate salt.

Since the fluotitanate salts encompassed within this invention are titanium compounds, it is interesting to compare these compounds with the titanium alkoxides which have been disclosed in the prior art such as U.S. Patent 2,727,881. The latter patent not only describes the use of such titanium catalysts but also describes various processes which have been referred to in more general terms hereinabove. One of the difficulties associated with the use of titanium compounds such as the alkoxides is that the polyesters produced by those processes ordinarily employed have undesirable color characteristics. Another disadvantage of these catalysts is their ease of hydrolysis in the presence of moisture which tends to inactivate their catalytic behavior. It was therefore rather surprising to find that the salts of fluotitanic acid are effective catalysts, give substantially colorless polymers and that fluotitanates of the elements of the periodic group IIB, particularly zinc and cadmium, show good catalytic activity for both the ester interchange first phase of the preparation of the polyester and the subsequent polymerization phase of the preparation of the polyester. The alkali metal salts as illustrated by potassium and lithium fluotitanates are best during the phase involving the polyesterification of the protopolymer or prepolymer.

The following table illustrates in a convenient form some of the aspects of this invention as discussed hereinabove as specifically applied to the condensation of dimethyl terephthalate (DMT) and ethylene glycol. The color index scale ranges from zero for perfectly colorless and clear to 4 for an unacceptable coloration. An index of 3 is just barely acceptable and 2 is satisfactory. Since the use of zinc acetate produces only a hardly noticeable color which is substantially colorless and clear and has a color index of 1, it is an excellent standard for comparison. The use of most of the known catalysts mentioned in the prior art generally produces color having an index value of about 2 or higher. For example, the use of titanium tetra-isopropoxide would result in a color index of 3 using the process employed in preparing the data for the table below. As shown in the table, the total time for zinc fluotitanate is 96 minutes using 100 p.p.m. while that for a combination of ZnAc and zinc fluotitanate is 80 minutes using a total of 200 p.p.m. In the first case, the elemental concentrations are 19.5 p.p.m. Zn and 14.3 p.p.m. Ti; in the second, 55.1 p.p.m. Zn and 14.3 p.p.m. Ti. If the first (line e) were doubled to 39 p.p.m. Zn and 28.6 p.p.m. Ti, it seems that the time order might even reverse. This, then, shows that zinc fluotitanate is a good catalyst alone. In Example 1 its use alone is specified.

| Catalyst | Total Catalyst Concentration, p.p.m. based on wt. of DMT | Time of Reaction (min.) | | | I.V. of Polyester | Color Index of Polyester |
| --- | --- | --- | --- | --- | --- | --- |
| | | 1st stage (ester-interch.) | 2nd stage (polymerization) | Total Time | | |
| (a) Zinc acetate, i.e. ZnAc$_2$ | 400 | 37 | 55 | 92 | 0.67 | 1 |
| (b) Potassium fluotitanate, i.e. K$_2$TiF$_6$ | 400 | inactive | | | | |
| (c) ZnAc$_2$ (400 p.p.m.) plus K$_2$TiF$_6$ (100 p.p.m.) | 500 | 24 | 21 | 45 | 0.64 | 2 |
| (d) ZnAc$_2$ (400 p.p.m.) plus K$_2$TiF$_6$ (100 p.p.m.) | 500 | 33 | 26 | 59 | 0.78 | 2 |
| (e) Zinc fluotitanate, i.e. ZnTiF$_6$·6H$_2$O | 100 | 56 | 40 | 96 | 0.74 | 1.5 |
| (f) AnAc$_2$ (100 p.p.m.) plus ZnTiF$_6$·6H$_2$O (100 p.p.m.) | 200 | 50 | 30 | 80 | 0.74 | 1 |

This invention can be further illustrated by the following examples of preferred embodiments although it will be understood that these examples are included merely for purposes of illustration and are not intended to limit the scope of the invention unless otherwise specifically indicated.

*Example 1*

A mixture in the ratio of 10 parts of dimethyl terephthalate, 6.7 parts of ethylene glycol, and 0.001 part of zinc fluotitanate (100 p.p.m.) was placed in a reaction vessel and was heated to 180° C. for two hours. The temperature was then raised gradually over the next two hours to 265° C. The reaction mixture was stirred mechanically at atmospheric pressure while being maintained under an inert atmosphere of dry nitrogen gas. The ester exchange product—methanol—was evolved during the early stages of the reaction in substantially theoretical quantity. After the first two hours the higher temperatures resulted in some ethylene glycol being distilled out; the amount evolved indicated that polymerization had already begun. The reaction mixture was then caused to flow as a film through a heated and evacuated tube where more glycol was liberated and final polymerization took place. The temperature of the tube was held at 285° C. and the pressure within the tube was reduced to 0.10 to 0.20 mm. Hg. The resulting polymer had an intrinsic viscosity of 0.74 and a color index of about 1.

*Example 2*

The above experiment described in Example 1 when carried out under similar conditions but using a mixture in the ratio of 10 parts dimethyl terephthalate, 6.7 parts ethylene glycol, 0.004 part zinc acetate (400 p.p.m.), 0.0016 part potassium fluotitanate (160 p.p.m.) yielded polymer product having an intrinsic viscosity of 0.68 and a color index of slightly over 1. The time required for the polymerization stage of the reaction was greatly reduced by the presence of the potassium fluotitanate. A repetition of this experiment reducing the amount of zinc acetate to 150 p.p.m. produced comparable results with an even better color index.

*Example 3*

The above experiment described in Example 1 when carried out under similar conditions but using a mixture in the ratio of 10 parts dimethyl terephthalate, 6.72 parts ethylene glycol, 0.00075 part zinc fluotitanate (75 p.p.m.), and 0.001 part zinc acetate (100 p.p.m.) produced a polymer of 0.66 intrinsic viscosity and a color index of 1.

*Example 4*

Examples 2 and 3 were each repeated using the same conditions except that sodium fluotitanate was used in lieu of potassium or zinc fluotitanate thereby giving a polymeric product having an intrinsic viscosity of about 0.6. The polyester produced using the low catalyst concentration of 175 p.p.m. as in Example 3 produced a color index of about 1.

*Example 5*

The conditions described in Example 3 were repeated except that sodium fluotitanate was employed thereby producing a polymer of about 0.6 intrinsic viscosity. The polyester produced using the low catalyst concentration of 175 p.p.m. as in Example 3 produced a color index of about 1.

*Example 6*

The conditions of Example 2 were repeated except that the potassium fluotitanate was replaced with the same amount of cadmium fluotitanate whereby the polymeric product produced had an intrinsic viscosity of about 0.7 and a color index slightly over 1.

*Example 7*

Example 1 was modified by employing 10 parts by weight of 1,4-cyclohexanedimethanol (70% trans isomer) in lieu of the 6.7 parts of ethylene glycol whereby the resulting polymer showed an intrinsic viscosity of about 0.8 and a color index of about 1. Corresponding procedures using cyclohexanedimethanol but otherwise similar to those described in Examples 2–7 were performed with the combinations of catalysts described in those examples whereby similar results were obtained although the intrinsic viscosities achieved were generally higher. It appears that 1,4-cyclohexylenedimethylene terephthalate is a polyester in which a given I.V. represents a somewhat lower molecular weight than in the case of polyethylene terephthalate.

Other polyesters can be produced in a manner analogous to that described in the preceding examples using the melt phase polymerization techniques described in the other examples or the powder buildup techniques described hereinabove. The vast number of reactants which can be used in the preparation of such polyesters is described in the prior art referred to above such as U.S. Patent 2,727,881.

The term "bifunctional" as used in this specification has the same meaning as it has in the numerous patents appearing in the prior art and as defined by Carothers in his early patents regarding the preparation of polyesters. Quite obviously the reactants must be bifunctional in order to get a polymer. The term bifunctional excludes unsaturated reactants as well as reactants which contain other functional groups such as amino groups, isocyanate groups, etc.

As indicated above, $ZnTiF_6$ appears to be the most advantageous fluotitanate salt. Even when used by itself it is a highly effective catalyst for preparing polyesters. Since its preparation has not been described in detail heretofore the following example is set forth:

*Example 8*

Twenty grams of titanium dioxide (Titanox A) was transferred to a platinum dish and 60 grams of 48% hydrofluoric acid was added at such a rate, with stirring, so that the heat of reaction maintained the temperature just under the boiling point. The mixture was kept near the boiling point for 30 minutes on a hot plate; then, allowed to cool and stand for several hours. The clear supernatent liquid was carefully decanted to a plastic beaker and the residue of titanium dioxide was washed once by centrifugation in a stainless steel centrifuge tube. The clear wash solution (ca. 25 ml.) was added to the main portion of the solution which was diluted with 65 ml. of water.

Solid zinc carbonate was added in increments at such a rate that a vigorous evolution of gas was maintained. When the effervescence stopped, the mixture was heated on a steam bath for 15 minutes. At this point, 26 grams of zinc carbonate had been added including about 1 gram excess which remained insoluble in the mixture. The pH of the solution was 4–5 by indicator test paper.

The solution was filtered and evaporated by blowing a stream of air on the surface of the liquid until crystals of product just began to form. Three hundred and ten milliliters of 3A alcohol was added which precipitated the product. The slurry was filtered on a fritted glass funnel, and washed once with 3A alcohol and air was aspirated through the product until it was almost dry. The solid product was spread out in an enameled tray and air dried for three days. The product weighed 55 grams as compared to a theoretical value of 67 grams of $ZnTiF_6 \cdot 6H_2O$ based on 25 grams of zinc carbonate.

The filtrate was evaporated to dryness which yielded a residue of 18 grams.

The invention has been described in detail with particular reference to preferred embodiments thereof, but it will be understood that variations and modifications can be effected within the spirit and scope of the invention as described hereinabove and as defined in the appended claims.

We claim:

1. A process for preparing a highly polymeric linear fiber forming polyester having an intrinsic viscosity of at least about 0.5 comprising condensing at an elevated temperature a lower dialkyl ester of a bifunctional dicarboxylic acid and a bifunuctional glycol in the presence of a catalytic composition composed essentially of from 1 to 2 parts by weight of a zinc salt of a lower alkanoic acid having from 2 to 6 carbon atoms and from 1 to 2 parts by weight of a fluotitanate salt of a metal selected from the group consisting of Li, Na, K, Mg, Ca, Zn and Cd whereby a substantially clear, colorless highly polymeric polyester is produced, said catalytic composition being from about 50 to about 1,000 parts per million based on the weight of said lower dialkyl ester.

2. A process as defined by claim 1 wherein said ester is dimethyl terephthalate, said glycol is ethylene glycol, said zinc salt is zinc acetate and said fluotitanate salt is potassium fluotitanate.

3. A process as defined by claim 1 wherein said ester is dimethyl terephthalate, said glycol is ethylene glycol, said zinc salt is zinc acetate and said fluotitanate salt is zinc fluotitanate.

4. A process as defined by claim 1 wherein said ester is dimethyl terephthalate, said glycol is 1,4-cyclohexanedimethanol, said zinc salt is zinc acetate and said fluotiatanate salt is potassium fluotitanate.

5. A process as defined by claim 1 wherein said ester is dimethyl terephthalate, said glycol is 1,4-cyclohexanedimethanol, said zinc salt is zinc acetate and said fluotitanate salt is zinc fluotitanate.

References Cited in the file of this patent

UNITED STATES PATENTS

| | | |
|---|---|---|
| 2,287,891 | Linckh | June 30, 1942 |
| 2,381,481 | Anderson | Aug. 7, 1945 |
| 2,681,360 | Vodonik | June 15, 1954 |
| 2,720,502 | Caldwell | Oct. 11, 1955 |